United States Patent
Aoki et al.

(10) Patent No.: US 6,304,005 B1
(45) Date of Patent: *Oct. 16, 2001

(54) POWER SUPPLY APPARATUS AND METHOD, AND FABRICATION APPARATUS

(75) Inventors: Shuji Aoki, Ebina; Shunzo Imai, Yamato, both of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/274,111

(22) Filed: Mar. 23, 1999

(30) Foreign Application Priority Data

Mar. 27, 1998 (JP) .................................. 10-081379

(51) Int. Cl.[7] ....................................................... H02J 7/00
(52) U.S. Cl. ................................ 307/64; 307/80; 307/85; 307/86; 307/116; 307/140
(58) Field of Search .................................. 307/64, 66, 67, 307/80, 81, 85, 86, 116, 125, 139, 140

(56) References Cited

U.S. PATENT DOCUMENTS

| 4,384,213 | * | 5/1983 | Bogel | 307/64 |
| 4,423,336 | | 12/1983 | Iverson et al. | 307/64 |
| 4,604,530 | | 8/1986 | Shibuya | 307/66 |
| 5,412,528 | | 5/1995 | Mäder et al. | 361/62 |
| 5,739,594 | * | 4/1998 | Sheppard et al. | 307/64 |
| 5,767,591 | * | 6/1998 | Pinkerton | 307/64 |

FOREIGN PATENT DOCUMENTS

| 0 770 942 | 5/1997 | (EP) . |
| 85-2180 | 5/1985 | (KR) . |

* cited by examiner

Primary Examiner—Stephen W. Jackson
Assistant Examiner—Robert L. DeBeradinis
(74) Attorney, Agent, or Firm—Fitzpatrick, Cella, Harper & Scinto

(57) ABSTRACT

A fabrication apparatus including an emergency stop circuit which is an emergency stop switch has a first electromagnetic switch for supplying and shutting off power to the apparatus and a second electromagnetic switch for controlling power supply to an electromagnetic coil of the first electromagnetic switch. Power is supplied to the electromagnetic coil of the first electromagnetic switch from the primary side of the first electromagnetic switch via a contact of the second electromagnetic switch. An uninterruptible power source supplies power to an electromagnetic coil of the second electromagnetic switch via the emergency stop circuit. This emergency stop switch is inserted midway along a power line to the electromagnetic coil of the second electromagnetic switch. This allows a safe emergency stop of the fabrication apparatus for semiconductors and the like. When the operation of the fabrication apparatus stops due to stoppage of power, the apparatus is automatically reactivated after the power is recovered. This increases the productivity.

30 Claims, 8 Drawing Sheets

POWER SUPPLY APPARATUS AND METHOD, AND FABRICATION APPARATUS

BACKGROUND OF THE INVENTION

1. Field of the Invention

The present invention relates to a fabrication apparatus for fabricating semiconductor devices and the like, and a power supply system in the fabrication plant.

2. Description of the Related Art

A semiconductor fabrication plant for fabricating semiconductor devices has a clean room containing a number of fabrication apparatuses, e.g., various processing apparatuses for fabrication steps such as lithography, testing apparatuses, and transfer apparatuses. The plant also has a power supply system for supplying power for operating these various apparatuses. This power supply system includes an installed power source for transforming commercial electric power supplied from an electric power company outside the plant and supplying the transformed power into the plant.

Normally, to start the operation of a fabrication apparatus, an operator (machine operator) operates a power ON switch to start supplying power to the fabrication apparatus to activate it. To stop the operation, the operator operates a power OFF switch to stop the supply of power from the installed power source to the fabrication apparatus to thereby stop the apparatus.

When the plant is in operation, however, trouble rarely occurs to make it necessary to urgently stop the operation of a fabrication apparatus. As a means for urgently stopping a fabrication apparatus, therefore, an emergency stop switch operable by an operator is usually arranged near the apparatus. When the operator operates this switch, an emergency stop circuit (EMO) operates to shut off power supply from the installed power source to all apparatuses such as a fabrication apparatus, air conditioner, and light source, thereby urgently stopping these apparatuses. However, if power supply to all apparatuses is abruptly shut off, the system may run away from the control when reactivated.

When the plant is in operation, supply of power sometimes stops owing to an unexpected power failure (including an instantaneous power failure) such as the power failure of a commercial power source or failure of a power source in the plant. If this is the case, power supply to the emergency stop circuit also stops, and a fail safe function of the emergency stop circuit sets the same state as when the emergency stop switch is pressed, thereby shutting off power supply from the installed power source.

To restart the operation of an apparatus, it is necessary to wait until an operator turns on the power switch after the installed power source is recovered. That is, even when an apparatus stops due to an instantaneous power failure, the operation of the apparatus cannot be restarted without the operation by an operator. When a large number of fabrication apparatuses are installed in the plant, it takes a long time for the operator to turn on the power sources of all fabrication apparatuses. This interferes with an increase in productivity.

SUMMARY OF THE INVENTION

The present invention has been made in consideration of the above situation, and has as its object to provide fabrication arrangements capable of achieving high safety and high productivity at the same time.

It is another object of the present invention to urgently and safely stop an apparatus in operation and, when the apparatus stops due to, e.g., a power failure or power source failure, reduce the time required to reactivate the apparatus, thereby increasing the productivity.

To achieve the above objects, a power supply apparatus according to one aspect of the present invention comprises first switching means for connecting and disconnecting a supply path of supplying first power to an apparatus as an object of power supply, second switching means for switching circuits to close the first switching means by receiving supply of second power by which power supply is maintained even when the first power stops, and third switching means for opening and closing a circuit in a supply path of supplying the second power to the second switching means.

According to another aspect of the present invention, a fabrication apparatus including the above power supply apparatus is provided.

According to still another aspect of the present invention, a fabrication apparatus including an emergency stop circuit which is an emergency stop switch is provided. This apparatus has a first electromagnetic switch for supplying and shutting off power to the apparatus and a second electromagnetic switch for controlling power supply to an electromagnetic coil of the first electromagnetic switch. Power is supplied to the electromagnetic coil of the first electromagnetic switch from the primary side of the first electromagnetic switch via a contact of the second electromagnetic switch. An uninterruptible power source supplies power to an electromagnetic coil of the second electromagnetic switch (relay) via the emergency stop circuit. This emergency stop switch is inserted midway along a power line to the electromagnetic coil of the second electromagnetic switch.

According to still another aspect of the present invention, a fabrication apparatus including an emergency stop means is provided. This apparatus has a controller which, when the apparatus stops operating owing to a power failure, automatically reactivates the apparatus after power is recovered. If the emergency stop means stops the operation of the fabrication apparatus, the controller does not automatically reactivate the apparatus even after power is recovered.

According to still another aspect of the present invention, there is provided a power supply system for a fabrication apparatus having an emergency stop function using an emergency stop switch. When the fabrication apparatus stops operating due to power failure, the power supply system automatically resupplies power to the fabrication apparatus after power is recovered. If the emergency stop function stops the operation of the fabrication apparatus, the power supply system does not automatically resupply power to the fabrication apparatus even after power is recovered.

According to still another aspect of the present invention, a method of fabricating a device is provided. This method fabricates a device by fabrication steps including steps of preparing the above fabrication apparatus and fabricating the device by using the fabrication apparatus.

According to still another aspect of the present invention, the above power supply apparatus supplies power to a plurality of fabrication apparatuses installed in a fabrication plant.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodi

DETAILED DESCRIPTION OF THE PREFERRED EMBODIMENTS

Preferred embodiments of the present invention will now be described in detail in accordance with the accompanying drawings.

<First Embodiment>

Figure 1:
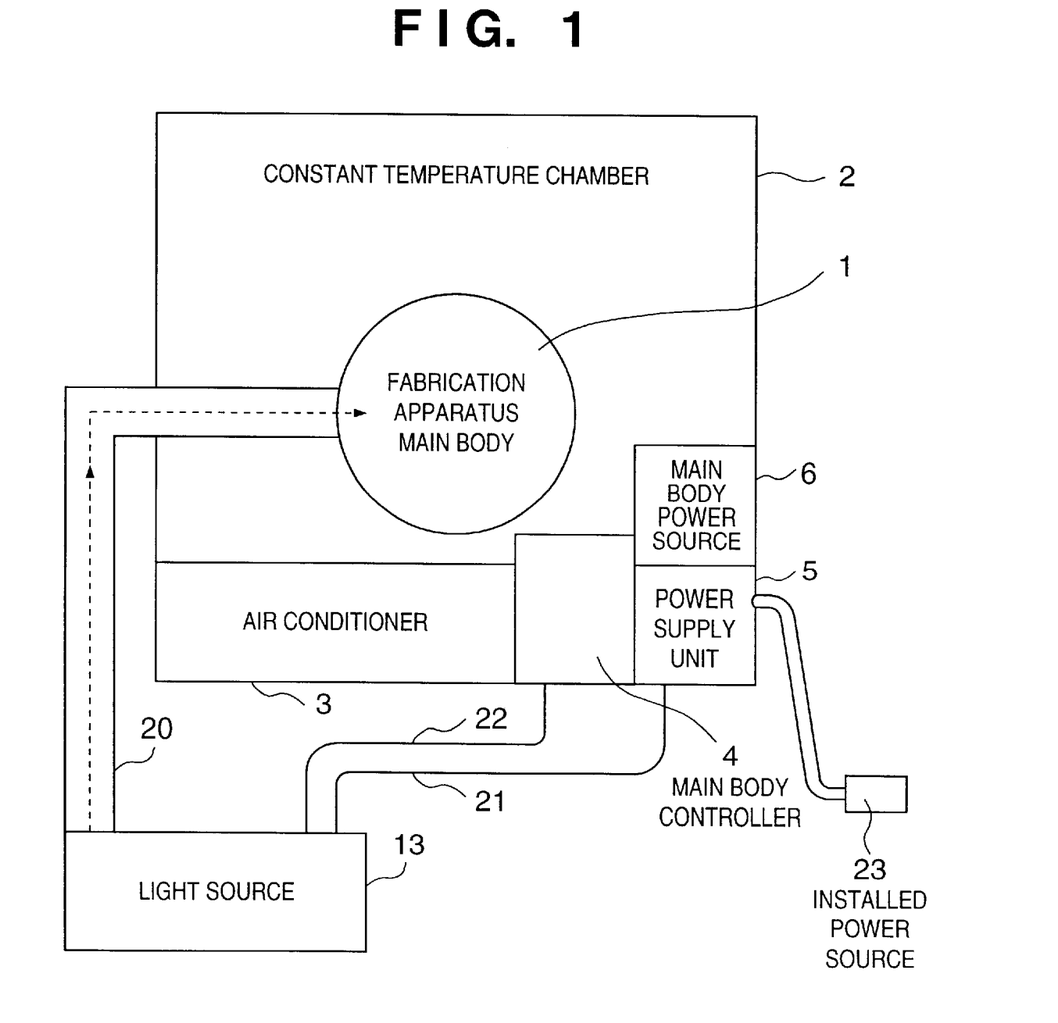
- FIG. 1 is a view showing the whole configuration of a semiconductor fabrication apparatus according to an embodiment of the present invention.

FIG. 1 is a view showing the arrangement of a semiconductor device fabrication apparatus according to the first embodiment of the present invention.

Referring to FIG. 1, an installed power source 23 of a fabrication plant supplies power to the fabrication apparatus. This installed power source 23 includes a main power source and a backup power source. In normal operation, the main power source transforms commercial electric power supplied from an electric power company to the semiconductor fabrication plant and supplies the transformed power to individual apparatuses in the plant. When this main power source cannot supply power because of, e.g., a power failure or power source failure, the backup power source supplies power into the factory instead of the main power source. This backup power source has an independent power generator such as a diesel generator.

The semiconductor fabrication apparatus is roughly divided into a fabrication apparatus main body 1, a main body power source 6, a constant temperature chamber 2, an air conditioner 3, a main body controller 4, and a power supply unit 5. The constant temperature chamber 2 contains the fabrication apparatus main body 1 and keeps it in a fixed environment. The air conditioner 3 holds the ambient temperature, gas concentration, cleanness, and the like in the constant temperature chamber 2 constant. The main body controller 4 controls operations of the fabrication apparatus main body 1 and the air conditioner 3. The power supply unit 5 supplies or shuts off power from the installed power source 23 to the main body power source 6 and the air conditioner 3. In this embodiment, the semiconductor fabrication apparatus is a semiconductor exposure apparatus for exposing a semiconductor wafer substrate. However, the present invention is similarly applicable to various processing apparatuses and testing apparatuses used in semiconductor fabrication.

A light source 13 is installed separately from the chamber 2 containing the fabrication apparatus main body 1. This light source 13 supplies exposure light to the fabrication apparatus main body 1 through a beam line 20. The light source 13 is, e.g., an excimer laser source or an X-ray source (SR or plasma X-ray source). The power supply unit 6 supplies power to the light source 13 through a power cable 21. A communication cable 22 connects the light source 13 and the main body controller 4.

Figure 2:
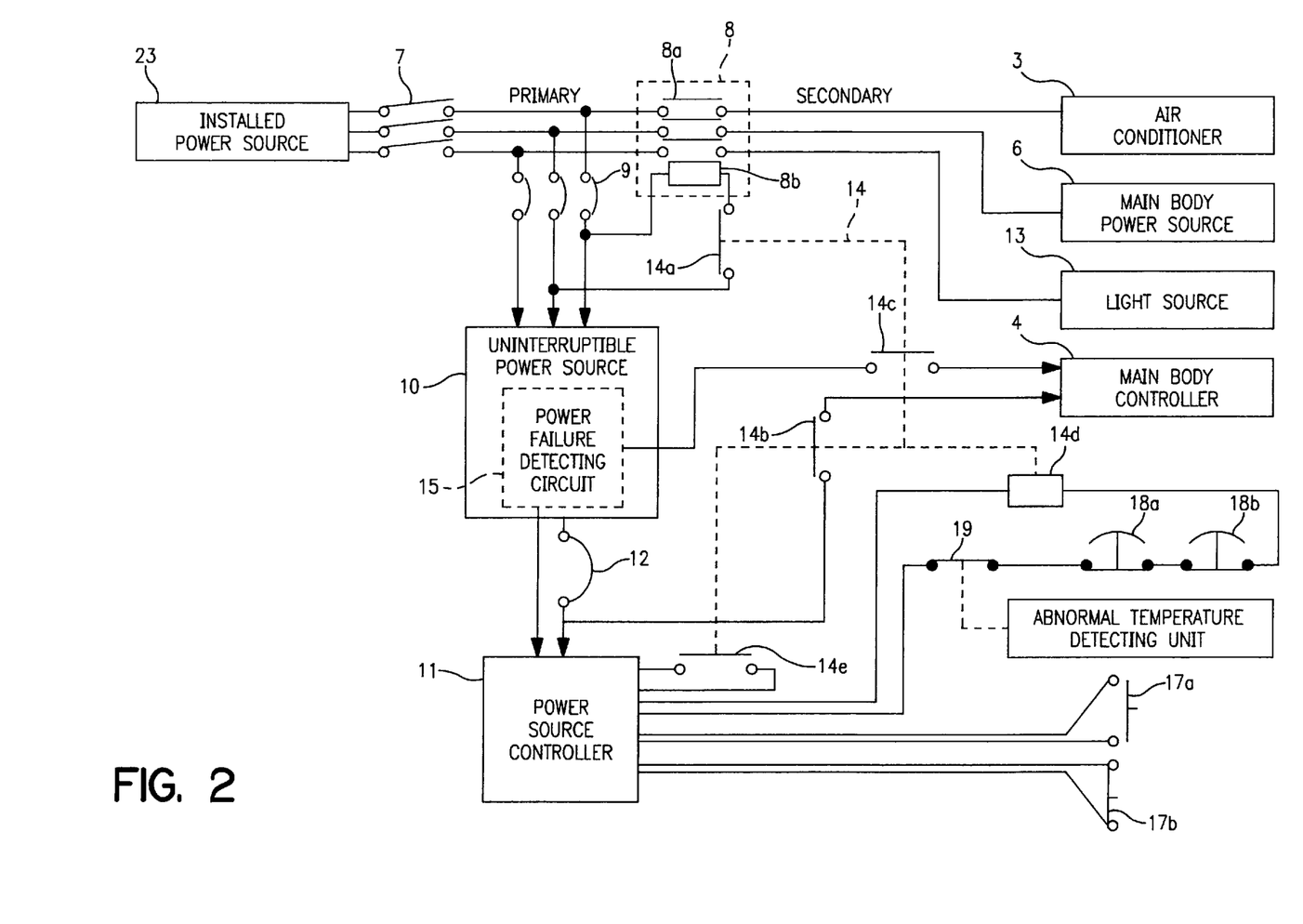
FIG. 2 is a block diagram showing the arrangement of a power supply system according to the embodiment.

FIG. 2 is a block diagram for explaining a power supply system of the power supply unit 5 in the semiconductor fabrication apparatus shown in FIG. 1. Power lines are formed from the installed power source 23 of the plant to the main body power source 6, the air conditioner 3, and the light source 13 via a main breaker 7 and a first electromagnetic switch 8 (a contactor including a contact 8a and an electromagnetic coil 8b for opening and closing the contact 8a) for turning on and off the power source. The upstream side (near the installed power source) and the down stream side (near the fabrication apparatus) of the contact 8a of the first electromagnetic switch 8 will be called a primary side and a secondary side, respectively.

The primary side of the electromagnetic switch 8 is branched and connected to an overcurrent protector 9, an uninterruptible power source 10, an overcurrent protector 12, and a power source controller 11 as an emergency stop circuit in this order. The uninterruptible power source 10 incorporates an AC/DC converter, a battery, and a power failure detecting circuit 15 for detecting a power failure (an instantaneous power failure and power failure for a few seconds to a few tens of minutes). This power failure detecting circuit 15 outputs a detection signal to the main body controller 4 and the power source controller 11.

The power source controller 11 is connected to a power ON switch 17a and a power OFF switch 17b. This power source controller 11 is also connected to an electromagnetic coil 14d of a second electromagnetic switch 14 (a relay including relay contacts 14a to 14c and 14e and the electromagnetic coil 14d for opening and closing these relay contacts 14a to 14c and 14e) for controlling power supply to the electromagnetic coil of the first electromagnetic switch 8. Two emergency stop switches 18a and 18b and a connecting terminal 19 to be opened and closed by an abnormal temperature detecting unit are inserted midway along the power line to the electromagnetic coil 14d. When this power line is disconnected by any of the first and second emergency stop switches 18a and 18b and the connecting terminal 19, supply of power to the electromagnetic coil 14d of the second electromagnetic switch 14 is shut off, and the relay contact 14a of the second electromagnetic switch 14 is opened. Accordingly, the first electromagnetic switch 8 is also opened. The emergency stop switches 18a and 18b are arranged in a portion of the outer wall of the constant temperature chamber 2 of the semiconductor fabrication apparatus where an operator readily accesses these switches.

The second electromagnetic switch 14 has four relay contact systems (14a to 14c and 14e) to be simultaneously opened and closed. The first system (relay contact 14a) controls power supply to the electromagnetic coil of the first electromagnetic switch 8. The remaining three systems are the relay contacts 14b, 14c and 14e. The relay contact 14b supplies and shuts off electric power to the main body controller 4. The relay contact 14c connects and disconnects the signal line for transmitting a detection signal from the power failure detecting circuit 15 to the main body controller 4. The relay contact 14e is used for discriminating whether the cause of power shut down comes from an operation of the emergency stop switch or power failure.

In summary, this power supply system includes the first electromagnetic switch 8 for supplying and shutting off power from the installed power source 23 to the individual apparatuses (exposure apparatus main body, air conditioner, and light source) and the second electromagnetic switch 14 for controlling power supply to the electromagnetic coil 8b of the first electromagnetic switch 8. Power is supplied to the electromagnetic coil 8b of the first electromagnetic switch 8 from the primary side of the first electromagnetic switch 8 via the relay contact 14a of the second electromagnetic switch 14. Also, power is supplied to the electromagnetic coil 14d of the second electromagnetic switch 14 via the power source controller 11 as an emergency stop circuit. The emergency stop switches 18a and 18b are inserted midway along the power line to the electromagnetic coil 14d of the second electromagnetic switch 14. The first and second electromagnetic switches 8 and 14 include the relay contacts 8a, 14a to 14c and 14e which are open when no power is supplied to the electromagnetic coils 8b and 14d and closed when power is supplied to these electromagnetic coils 8b and 14d. The emergency stop switches 18a and 18b are normally closed to supply power. When activated, these emergency stop switches 18a and 18b are opened to shut off the power supply.

FIG. 2 shows the states of the electromagnetic switches when the apparatuses are stopped. The uninterruptible power source 10 converts an AC voltage divided on the primary side of the electromagnetic switch 8 into a DC voltage; and of 24 V. This power is used to charge the built-in battery and also is supplied to the power source controller 11 and the main body controller 4.

Figure 6:
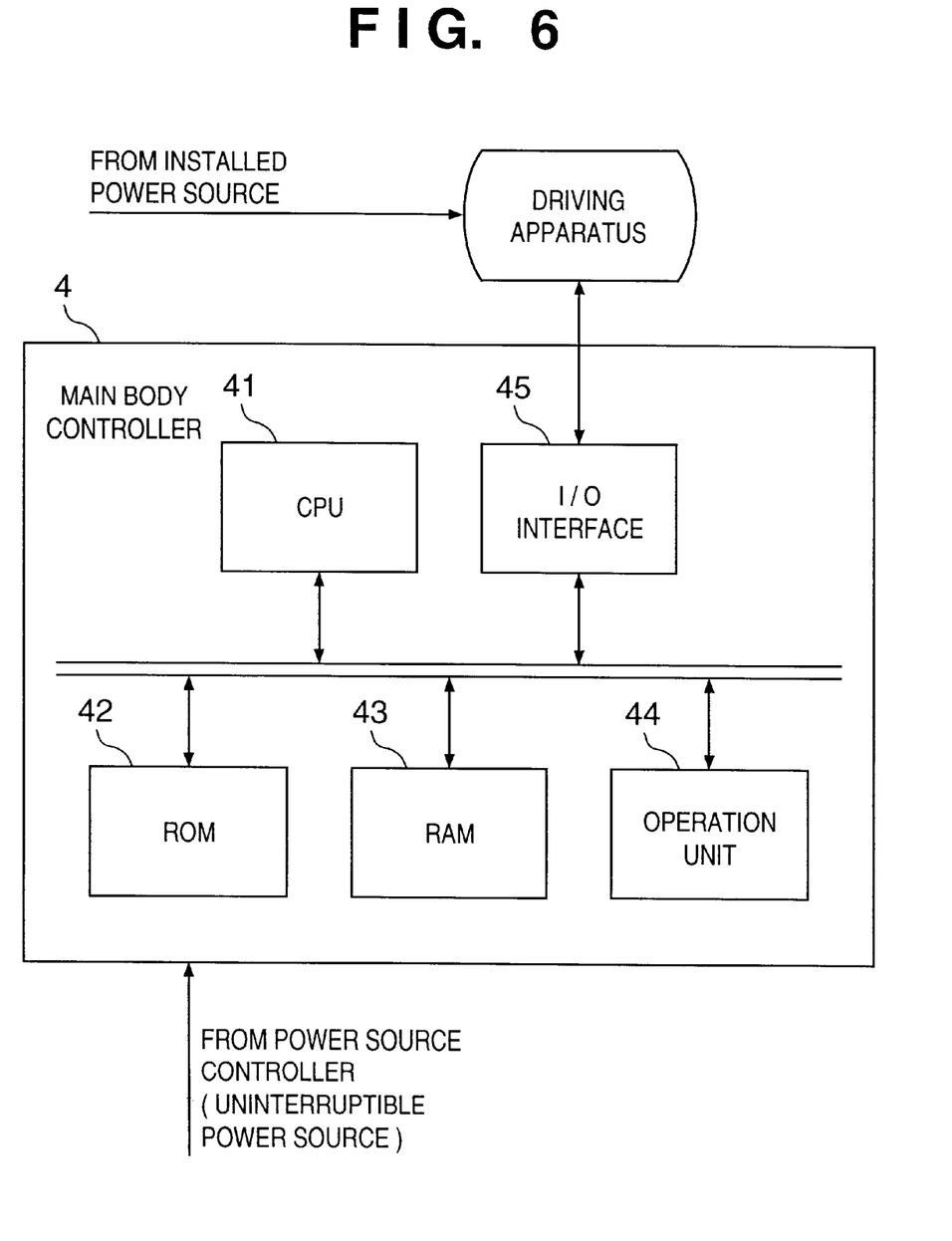
FIG. 6 is a block diagram showing the configuration of a main body controller according to the embodiment.

FIG. 6 is a block diagram showing details of the arrangement of the main body controller 4. In this main body controller 4, a CPU 41 controls, e.g., the fabrication apparatus main body 1, the air conditioner 3, the main body power supply unit 6, and the light source 13 by executing control programs stored in a ROM 42. A RAM 43 provides a work area when the CPU 41 executes these control programs. An operation unit 44 includes operation switches for, e.g., activating and stopping the fabrication apparatus, indicators for indicating the operating state of the apparatus, and the like. An I/O interface 45 transmits a driving signal from the CPU 41 to a driving apparatus. As shown in FIG. 2, the installed power source 23 supplies power to the driving system, and the power source controller 11 (the uninterruptible power source 10) supplies power to the main body controller 4.

An operation of turning on the power source in the above configuration will be described below. When an operator presses the power ON switch 17a while power is supplied to the installed power source 23, the power source controller 11 supplies power to the electromagnetic coil 14d of the second electromagnetic coil 14. As a consequence, the relay contacts 14a to 14c and 14e of the second electromagnetic switch 14 are closed. Accordingly, power is supplied to the electromagnetic coil 8b of the first electromagnetic switch 8, and the relay contact 8a of the first electromagnetic switch 8 is also closed. Power supply to the main body power supply unit 6, the air conditioner 3, and the light source is thus started to perform exposure for device fabrication. To normally stop the fabrication apparatus, an operator presses the power OFF switch 17b.

The operations of activating and stopping the apparatus will be described in more detail below. To activate the apparatus, an operator presses the power ON switch 17a to allow the power source controller 11 to supply power from the uninterruptible power source 10 to the coil 14d of the second electromagnetic switch 14 (relay). Since the relay contact 14a of the second electromagnetic switch 14 is closed, power is supplied to the coil 8b of the first electromagnetic switch 8. Simultaneously, the relay contact 14b is activated to supply power to the main body controller 4. Consequently, the relay contact Ba is closed to supply power from the installed power source 23. In this state, the operator presses the activation switch on the operation unit 44 to allow the fabrication apparatus to start operating. To stop the apparatus, the operator first presses the stop switch on the operation unit 44 to shift the apparatus from an operating state to a stop state. After that, the operator presses the power OFF switch 17b to shut off the power supply from the power source controller 11. Consequently, the relay contact 14a opens to shut off the power supply to the coil 8b of the first electromagnetic switch 8. This opens the relay contact 8a to shut off the power supply to the installed power source 23.

An emergency stop operation when the emergency stop switch is pressed while the apparatus is in operation will be described below. If an operator presses (opens) the emergency stop switch 18a or 18b or the abnormal temperature detecting unit 20 detects an over-temperature indicating an apparatus error (the contact terminal 19 is open), the power supply path from the power source controller 11 to the electromagnetic coil 14b of the second electromagnetic switch 14 is disconnected. Accordingly, the relay contact 14a opens to shut off the power supply to the electromagnetic coil 8b of the first electromagnetic switch 8, and the relay contact 8a opens. This stops the power supply to the main body power supply unit 6, the air conditioner 3, and the light source 13. The power supply to the main body controller 4 is stopped when the relay contact 14b of the second electromagnetic switch 14 opens. A signal from the power failure detecting circuit 15 is disabled when the relay contact 14c of the second electromagnetic switch 14 opens. In the case of an emergency stop, therefore, the power supply from the installed power source 23 to the apparatus is completely shut off except for the primary side of the first electromagnetic switch 8 as a power shut-off device and the power source controller 11 as an emergency stop circuit. Accordingly, high safety can be maintained.

Since a relay contact 14e of the second electromagnetic switch 14 opens, the power source controller 11 can detect an emergency stop. When detecting an emergency stop, the power source controller 11 stops the supply from the uninterruptible power source until the start switch 17a is again pressed. Hence, when an emergency stop occurs, the apparatus cannot be reactivated unless the operator again presses the power ON switch 17a to turn on the power source. Consequently, the safety can be improved. In an emergency stop, the power supply to the main body controller 4 is also shut off, so the CPU 41 of the main body 4 is initialized. Therefore, a normal initialization procedure is necessary to recover the apparatus.

An operation when an unexpected power failure occurs in the installed power source 23 while the apparatus is in operation will be described below. If this is the case, the power supply to the electromagnetic coil 8b of the first electromagnetic switch 8 is stopped at the same time the power supply from the installed power source 23 stops. Therefore, the relay contact 8a of the first electromagnetic switch 8 opens to disconnect the power line to the air conditioner 3, the fabrication apparatus main body 6, and the light source 13. Meanwhile, the power failure detecting circuit 15, the power source controller 11, and the main body controller 14 are held steady because the backup power supply from the uninterruptible power source 10 is maintained. A big difference from the emergency stop described above is that the relay contacts 14a to 14c and 14e of the second electromagnetic switch 14 are kept closed. The main body controller 4 receives a signal indicating a power failure of the installed power source 23 detected by the power failure detecting circuit 15 and stores operation parameters of the fabrication apparatus main body and the air conditioner.

When the installed power source 23 recovers from the power failure, power is supplied to the electromagnetic coil 8b of the first electromagnetic switch 8 because the relay contact 14a of the second electromagnetic switch 14 is kept closed. Therefore, the relay contact 8a of the first electromagnetic switch 8 again is closed to restart power supply to the air conditioner 3, the main body power supply unit 6, and the light source 13. When the power supply is thus restarted, the operation starts on the basis of the operation parameters stored immediately before the power failure by the main body controller 4. Hence, the operation can be smoothly returned.

The power source controller 11 and the main body controller 4 include built-in timers. If the power failure detecting circuit 15 detects recovery from a power failure within a predetermined time (e.g., seven seconds) after detecting the power failure, the apparatus is automatically reactivated. If power failure continues over the predetermined time set in the timer, the fabrication apparatus main body 1, the air conditioner 3, and the light source 13 are not automatically reactivated even when the power failure detecting circuit 15 detects recovery from the power failure after that. As when the emergency stop circuit operates, the apparatus is not reactivated unless the operator operates the power switch. The predetermined time of the timer by which whether reactivation is possible is determined can be freely set from a fraction of a second to a few tens of minutes.

In reactivating the apparatus, it is also possible to first reactivate the air conditioner 3 and then automatically reactivate the semiconductor fabrication apparatus main body 1 and the light source 13. The air conditioner 3 is preferentially reactivated because this air conditioner 3 requires the longest time to return the environment in the constant temperature chamber 2 to a steady state.

The operations of the main body controller 4 and the power source controller 11 will be described in more detail below with reference to the flow charts in FIGS. 7 and 8.

Figure 7:
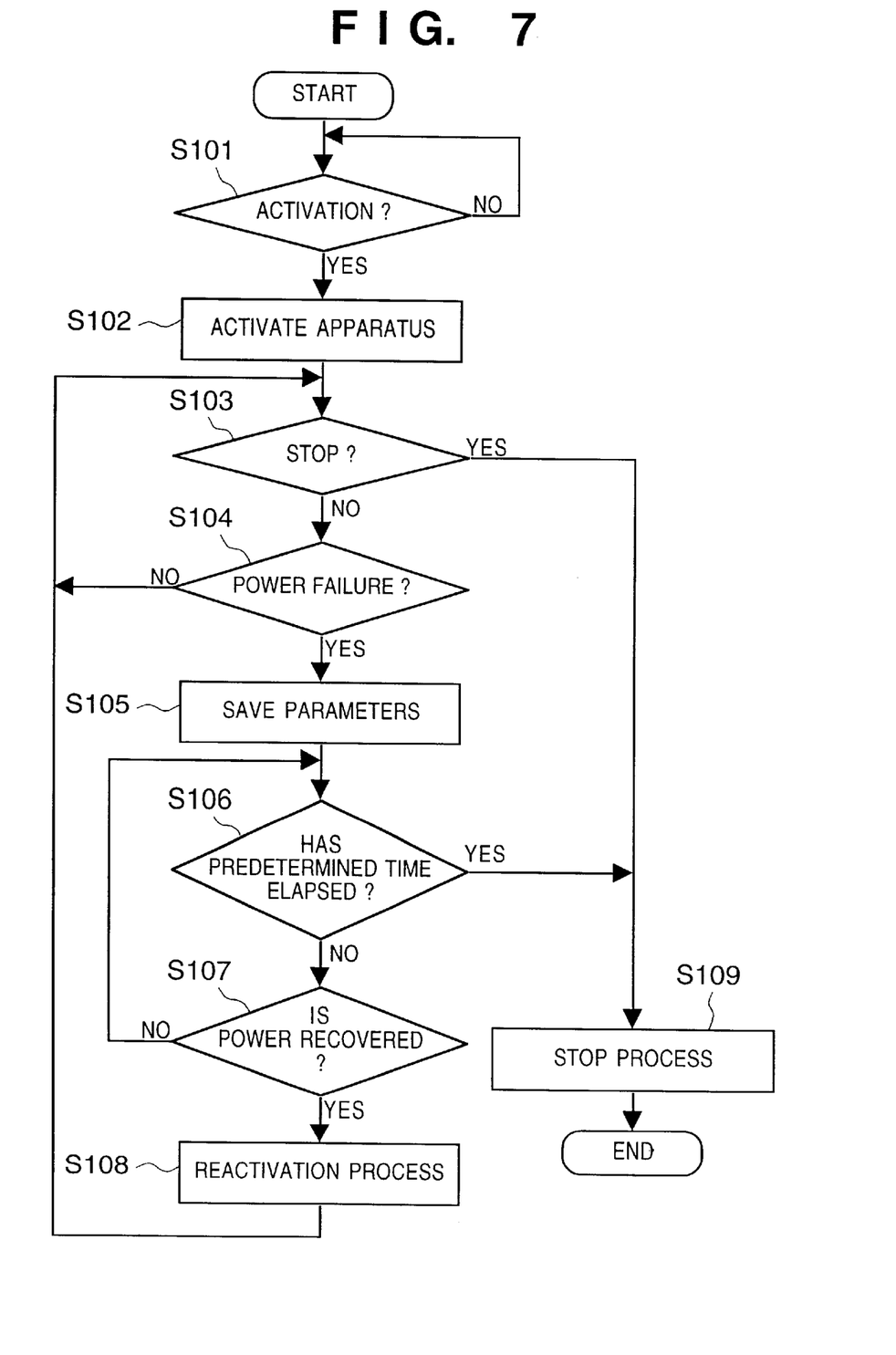
FIG. 7 is a flow chart for explaining the operation of the main body controller according to the embodiment.

FIG. 7 is a flow chart for explaining processes of activation, stop, and emergency stop. Control programs for realizing these processes are stored in the ROM 42. When an operator presses the activation switch on the operation unit 44, this apparatus is activated (steps S101 and S102). It should be evident to those skilled in the art that supply of the installed power source, initial positions of individual devices, and variation of activation conditions are checked in these steps. When the apparatus is in operation, the CPU 41 monitors an operation of the stop switch on the operation unit 44 or a power failure detection signal from the power failure detecting circuit 15. If the stop switch is operated, the CPU 41 stops the apparatus (steps S103 and S109). If a power failure is detected, the CPU 41 saves operation information such as parameters of apparatuses in operation into the RAM 43 in order to prepare for automatic reactivation upon power recovery (steps S401 and S105). If the power is recovered within a predetermined time, the CPU 41 reactivates the apparatus by using the parameters saved in the RAM 43 (steps S106 to S108). If the CPU 41 reactivates the apparatus from the air conditioner as described above, the CPU 41 executes a preprogrammed predetermined reactivation process. If the power is not recovered within the predetermined time, the flow advances to the stop process (steps S106 and S109).

Figure 8:
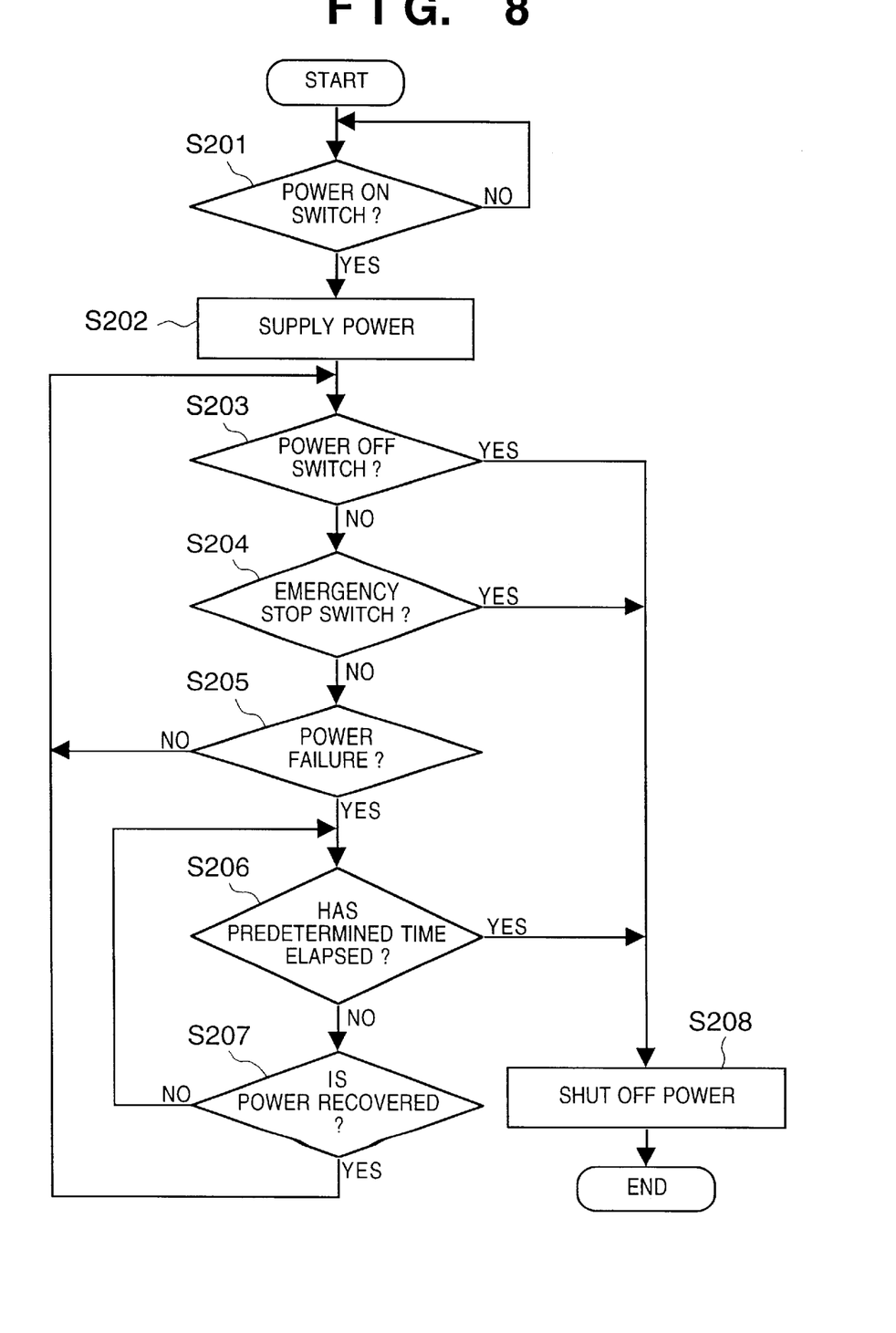
FIG. 8 is a flow chart for explaining the operation of a power source controller according to the embodiment.

FIG. 8 is a flow chart for explaining the operation of the power source controller. When an operator presses the power ON switch 17a, power supply to the second electromagnetic switch 14 is started (steps S201 and S202) While the power is supplied, the CPU 41 monitors the power OFF switch 17b, occurrence of an emergency stop, and occurrence of a power failure. If the power OFF switch 17b is pressed or the relay contact 14e opens to detect an emergency stop, the power source controller 11 stops power supply (steps S203, S204, and S208). When a power failure is detected, the power source controller 11 keeps supplying power if the power is recovered within a predetermined time (steps S206 and S207). If the power is not recovered within the predetermined time, the power source controller 11 stops power supply (steps S206, S207, and S208).

The above procedure of the power source controller 11 can be realized by using relay circuits and the like or a microcomputer. In either case, the circuit configuration is obvious to those skilled in the art.

The built-in battery of the uninterruptible power source 10 has enough capacity to continuously supply power to the power source controller 11 and the main body controller 4 for a maximum of 20 minutes required for the installed power source 23 to switch from the commercial power source to the independent power generator when a power failure occurs. As described at the beginning, the installed power source includes an independent power generator such as a diesel generator as a backup power source. However, a predetermined initialization time (usually about 10 minutes) is required to activate the independent power generator, so power supply is stopped during a switching period in which the power source stops and the backup power source starts supplying power. For this reason, the built-in battery of the uninterruptible power source 10 has enough capacity to supply power for a time (e.g., 20 minutes) longer than this switching period (e.g., 10 minutes).

Figure 3:
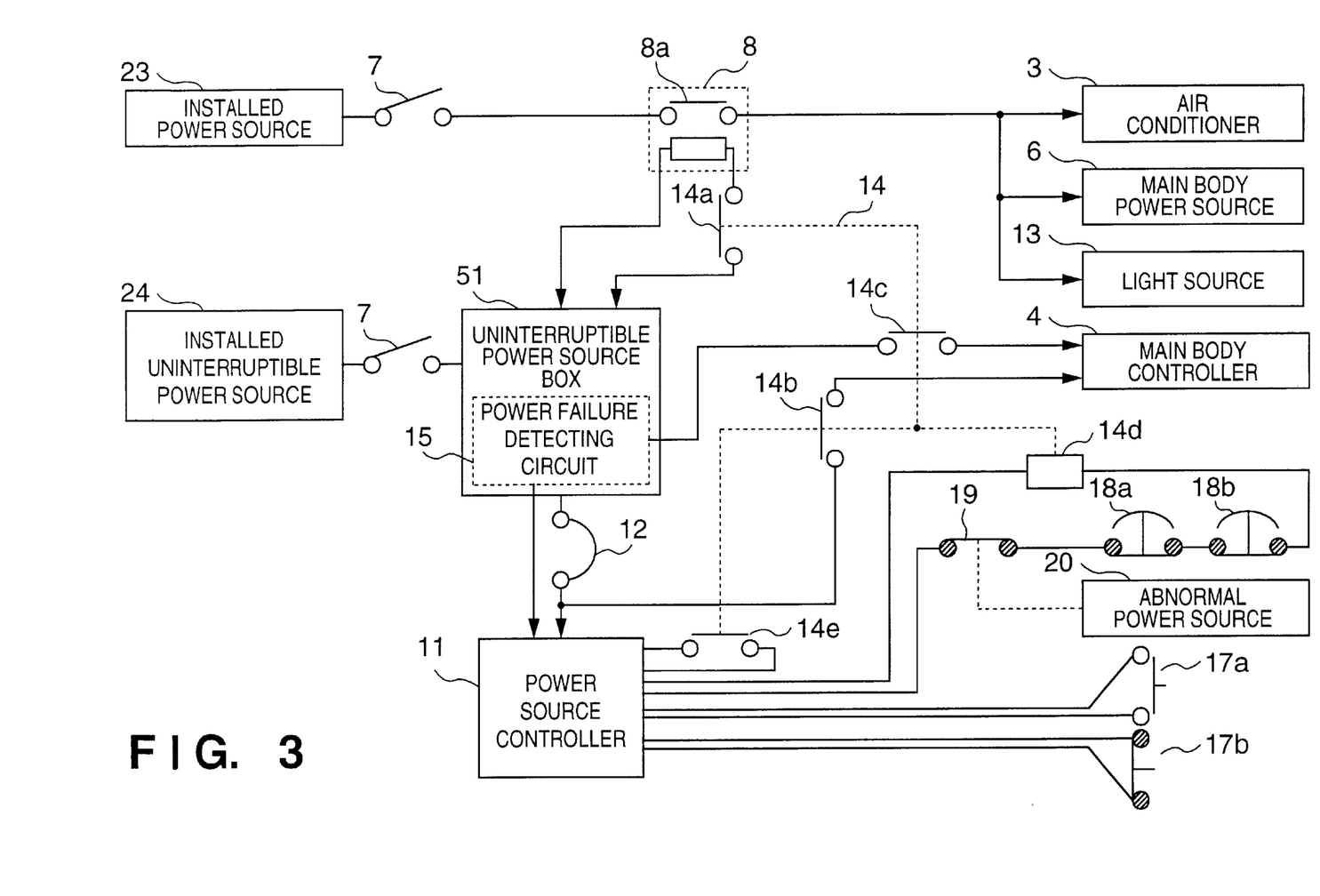
FIG. 3 is a block diagram showing the arrangement of a power supply system according to a modification of the embodiment.

Some fabrication plants are equipped with an uninterruptible power source (DC) for a short-time power failure. Therefore, the uninterruptible power source 10 of the above embodiment can also be replaced with this uninterruptible power source of the plant. FIG. 3 shows the arrangement of this modification. The same reference numerals as in FIG. 1 denote the same parts in FIG. 3, and a detailed description thereof will be omitted. In FIG. 3, reference numeral 24 denotes an installed uninterruptible power source of a plant; and 51, an uninterruptible power source box which includes a circuit for converting an AC voltage supplied from the installed uninterruptible power source 24 into a DC voltage of 24 V.

The above embodiment has described a semiconductor fabrication apparatus including an emergency stop circuit which is an emergency stop switch. When this semiconductor fabrication apparatus stops operating due to a power failure, a controller automatically reactivates the semiconductor fabrication apparatus after the power is recovered. If the emergency stop circuit stops the operation of the semiconductor fabrication apparatus, the controller does not automatically reactivate the semiconductor fabrication apparatus. In other words, this embodiment is a power supply apparatus of a fabrication apparatus having an emergency stop function using an emergency stop switch. When the fabrication apparatus stops operating owing to a power failure, the power supply apparatus automatically resupplies power to the fabrication apparatus after the power is recovered. If the emergency stop function stops the operation of the fabrication apparatus, the power supply apparatus does not automatically resupply power to the fabrication apparatus.

This makes it possible to provide an apparatus capable of reducing the time required to restart the operation without lowering the safety even when the supply of power stops owing to an unexpected cause such as a power failure or power source failure. Also, if the emergency stop circuit urgently stops the fabrication apparatus, the apparatus is reactivated only when an operator again turns on the power source (operates the switch 17*a*). As a consequence, a high-safety power supply system free of apparatus runaway can be provided. That is, this system successfully achieves both safety and productivity on a high level.

<Second Embodiment>

A device fabrication method using the aforementioned fabrication apparatus will be described below.

Figure 4:
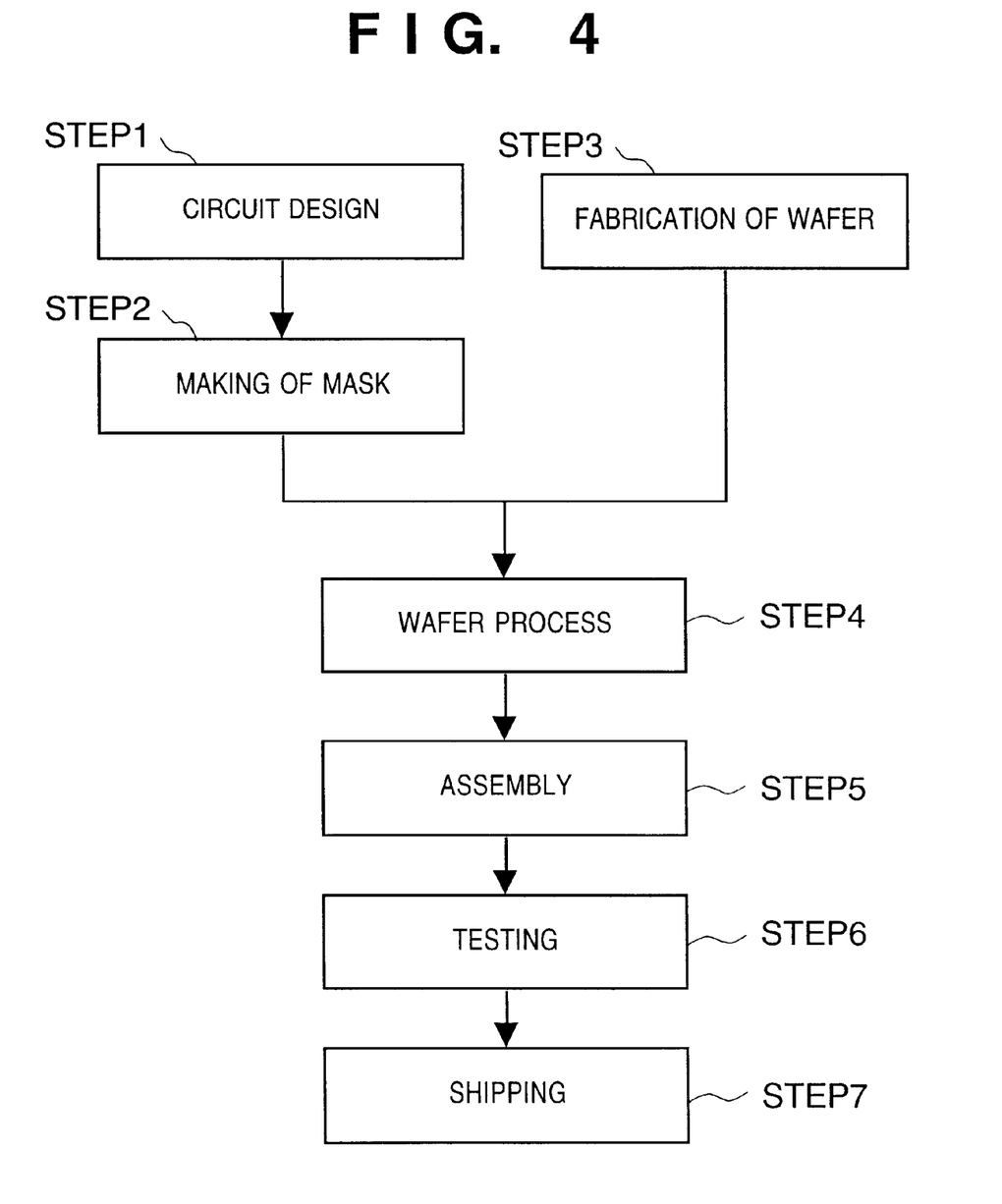
FIG. 4 is a flow chart showing an embodiment of device fabrication.

FIG. 4 shows the flow of fabrication of a microdevice (e.g., a semiconductor chip such as an IC or LSI, liquid crystal panel, CCD, thin-film magnetic head, or micromachine). In step 1 (circuit design), a device pattern is designed. In step 2 (making of mask), a mask having the designed pattern is made. In step 3 (fabrication of wafer), a wafer is fabricated by using a material such as silicon or glass. Step 4 (wafer process) is called a pre-process in which the prepared mask and wafer are used to form an actual circuit on the wafer by lithography. Step 5 is called a post-process in which the wafer fabricated in step 4 is formed into semiconductor chips. This step 5 includes steps such as an assembly step (dicing and bonding) and a packaging step (chip encapsulation). In step 6 (testing), tests such as an operation test and a durability test of the fabricated semiconductor devices are performed. The semiconductor devices are completed through these steps and shipped (step 7).

Figure 5:
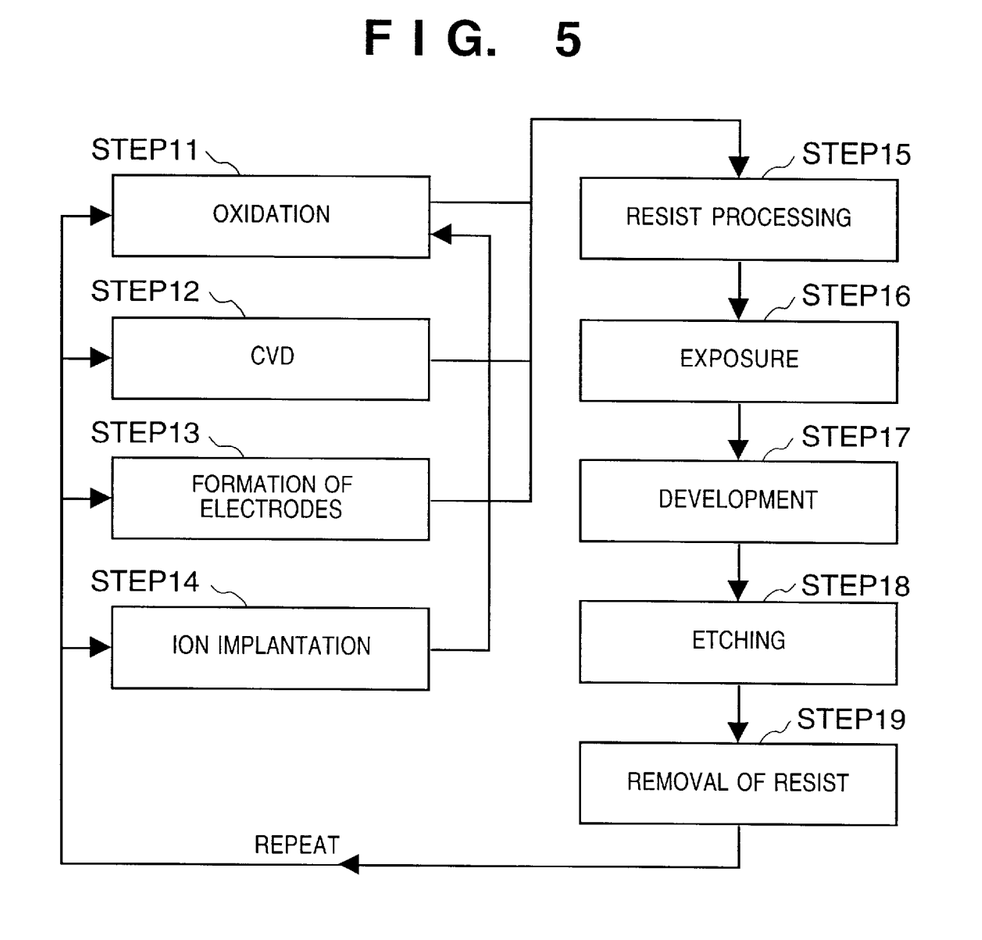
FIG. 5 is a flow chart showing a wafer process.

FIG. 5 shows details of the above wafer process flow. In step 11 (oxidation), the surface of a wafer is oxidized. In step 12 (CVD), an insulating film is formed on the wafer surface. In step 13 (formation of electrodes), electrodes are formed on the wafer by vapor deposition. In step 14 (ion implantation), ions are implanted into the wafer. In step 15 (resist processing), the wafer is coated with a resist. In step 16 (exposure), an exposure apparatus is used to bake mask circuit patterns in a plurality of shot regions on the wafer by exposure. In step 17 (development), the exposed wafer is developed. In step 18 (etching), portions except for the developed resist image are etched away. In step 19 (resist removal), the resist which is unnecessary after the etching is removed. By repeatedly performing these steps, multiple circuit patterns are formed on the wafer. When the fabrication method of this embodiment is used, high-accuracy devices which are conventionally difficult to fabricate can be fabricated with high safety, high productivity, and low cost.

The present invention can achieve high safety and high productivity at the same time. For example, to urgently stop a fabrication apparatus in operation, the apparatus can be stopped while runaway of the system is prevented. Also, even when power supply is stopped owing to an unexpected cause such as a power failure or power source failure, the time required to restart the operation can be reduced without lowering the safety.

Another aspect of the present invention can provide a device fabrication method or fabrication plant which achieves high safety and high productivity at the same time.

As many apparently widely different embodiments of the present invention can be made without departing from the spirit and scope thereof, it is to be understood that the invention is not limited to the specific embodiments thereof except as defined in the appended claims.

What is claimed is:

1. A power supply apparatus, comprising:
   first switching means for connecting and disconnecting a supply path of supplying first power to an apparatus as an object of power supply;
   second switching means for switching circuits to close said first switching means by receiving a supply of second power by which power supply is maintained even when the first power stops; and
   third switching means for opening and closing a circuit in a supply path of supplying the second power to said second switching means.

2. The apparatus according to claim 1, wherein said third switching means comprises an emergency stop switch which is normally closed, and is opened when operated.

3. The apparatus according to claim 1, wherein said third switching means comprises a contact which opens when an apparatus error is detected.

4. The apparatus according to claim 1, further comprising an uninterruptible power source for generating the second power by using the first power.

5. The apparatus according to claim 4, wherein
   the first power is AC power, and
   said uninterruptible power source generates the second power by converting the first power into DC power.

6. The apparatus according to claim 1, wherein
   said first switching means is kept closed by supplying the first power to a driving unit thereof, and
   said second switching means connects and disconnects a power supply path to said driving unit of said first switching means.

7. The apparatus according to claim 6, wherein each of said first and second switching means comprises an electromagnetic coil as said driving unit and a relay which is open when no power is supplied to said electromagnetic coil and closed when power is supplied thereto.

8. The apparatus according to claim 1, further comprising fourth switching means interlocked with said second switching means to connect and disconnect a supply path for supplying the second power to a control apparatus of said apparatus as an object of power supply.

9. The apparatus according to claim 1, further comprising switch control means for controlling power supply to said second switching means.

10. The apparatus according to claim 9, wherein said third switching means connects and disconnects said second power supply path between said switch control means and said second switching means.

11. The apparatus according to claim 9, wherein said switch control means starts supplying the second power on the basis of an operation indicating power ON and stops supplying the second power on the basis of an operation indicating power OFF.

12. The apparatus according to claim 9, wherein said switch control means stops supplying power when said third switching means is turned off.

13. The apparatus according to claim 9, wherein
   said apparatus further comprises power failure detecting means for detecting stoppage of supply of the first power, and
   said switch control means keeps supplying the second power to each power supply path for a predetermined time after said power failure detecting means detects a power failure, and stops supplying the power thereafter.

14. The apparatus according to claim 13, further comprising setting means for setting the predetermined time.

15. The apparatus according to claim 13, further comprising informing means for informing a control apparatus of said apparatus as an object of the power supply the said power failure detecting means detects a power failure.

16. The apparatus according to claim 14, further comprising fifth switching means interlocked with said second switching means to supply and shut off a signal on a signal transmission path of said informing means.

17. A fabrication apparatus capable of separately supplying power to a driving apparatus and a control apparatus, comprising:

first switching means for connecting and disconnecting a supply path of supplying first power to said driving apparatus;

second switching means for switching circuits to close said first switching means by receiving a supply of second power by which power supply is maintained even when the first power stops;

third switching means for opening and closing a circuit in a supply path of supplying the second power to said second switching means; and supply means for supplying the second power to said control apparatus.

18. The apparatus according to claim 17, wherein said third switching means comprises an emergency stop switch which is normally closed and open when operated.

19. The apparatus according to claim 17, wherein said third switching means comprises a contact which opens when an apparatus error is detected.

20. The apparatus according to claim 17, further comprising an uninterruptible power source for generating the second power by using the first power.

21. The apparatus according to claim 17, wherein said first switching means is kept closed by supplying the first power to a driving unit thereof, and said second switching means connects and disconnects a power supply path to said driving unit of said first switching means.

22. The apparatus according to claim 21, wherein each of said first and second switching means comprises an electromagnetic coil as said driving unit and a relay which is open when no power is supplied to said electromagnetic coil and closed when power is supplied thereto.

23. The apparatus according to claim 17, further comprising fourth switching means interlocked with said second switching means to connect and disconnect a supply path for supplying the second power to said control apparatus.

24. The apparatus according to claim 17, further comprising switch control means for controlling power supply to said second switching means.

25. The apparatus according to claim 17, further comprising:

power failure detecting means for detecting stoppage and recovery of supply of the first power; and reactivating means for automatically reactivating said driving apparatus when said power failure detecting means detects stoppage of power in said control apparatus and detects recovery of the power.

26. The apparatus according to claim 25, wherein said reactivating means reactivates said driving apparatus only when said power failure detecting means detects stoppage of supply of the first power and a period of the stoppage is not longer than a predetermined time.

27. The apparatus according to claim 26, further comprising setting means for setting the predetermined time.

28. The apparatus according to claim 17, wherein said fabrication apparatus is a semiconductor fabrication apparatus.

29. The apparatus according to claim 17, wherein said fabrication apparatus is an apparatus for exposing a semiconductor substrate.

30. A power supply method of inputting first power and second power which is kept supplied even when the first power stops, and supplying the first power to an apparatus via first switching means, comprising the steps of:

supplying the second power in accordance with power ON to second switching means for supplying driving power to said first switching means;

driving said second switching means to supply driving power to said first switching means to start supplying the first power to said apparatus; and shutting off supply of the second power to said second switching means in accordance with an emergency operation or detection of abnormality.

* * * * *

UNITED STATES PATENT AND TRADEMARK OFFICE
CERTIFICATE OF CORRECTION

PATENT NO.    : 6,304,005 B1
DATED         : October 16, 2001
INVENTOR(S)   : Shuji Aoki et al.

It is certified that error appears in the above-identified patent and that said Letters Patent is hereby corrected as shown below:

Column 5,
Line 25, "voltage; and" should read -- voltage --.

Column 6,
Line 2, "Ba" should read -- 8a --.

Column 9,
Line 2 "S202)" should read -- S202). --.

Column 10,
Line 64, "the said" should read -- that said --.

Signed and Sealed this

Thirtieth Day of April, 2002

Attest:

Attesting Officer

JAMES E. ROGAN
*Director of the United States Patent and Trademark Office*